(12) United States Patent
Nelson et al.

(10) Patent No.: US 8,486,233 B2
(45) Date of Patent: Jul. 16, 2013

(54) APPARATUS, PROCESS AND SYSTEM FOR DELIVERING FLUID TO A DISTILLATION COLUMN OR REACTOR

(75) Inventors: Alphonzo George Nelson, Novato, CA (US); Les Jackowski, Concord, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 275 days.

(21) Appl. No.: 12/967,948

(22) Filed: Dec. 14, 2010

(65) Prior Publication Data

US 2012/0145529 A1    Jun. 14, 2012

(51) Int. Cl.
*B01D 3/00* (2006.01)
*B01J 19/26* (2006.01)
*B01J 4/00* (2006.01)

(52) U.S. Cl.
USPC ........... 203/25; 159/24.3; 159/43.1; 159/901; 165/108; 165/158; 202/182; 202/262; 203/98; 203/100; 203/DIG. 14; 203/DIG. 25; 422/198; 422/285

(58) Field of Classification Search
USPC ................ 159/24.3, 43.1, 901; 202/152, 182, 202/262; 203/25, 98, 100, DIG. 14, DIG. 25; 422/198, 285; 165/108, 158
See application file for complete search history.

(56) References Cited

U.S. PATENT DOCUMENTS

| | | | | |
|---|---|---|---|---|
| 2,795,536 | A | * | 6/1957 | Pryor et al. ..................... 203/98 |
| 3,280,010 | A | | 10/1966 | Creighton et al. |
| 4,019,866 | A | | 4/1977 | Jaswal et al. |
| 4,551,979 | A | * | 11/1985 | Wilensky ........................ 60/648 |
| 5,037,510 | A | * | 8/1991 | Nygards ......................... 202/83 |
| 5,678,425 | A | | 10/1997 | Agrawal et al. |
| 6,666,956 | B1 | * | 12/2003 | Nishimura et al. ............... 203/1 |
| 2003/0005823 | A1 | | 1/2003 | Le Blanc et al. |

FOREIGN PATENT DOCUMENTS

| WO | 2010006934 | 1/2010 |
|---|---|---|
| WO | 2010079177 | 7/2010 |

OTHER PUBLICATIONS

PCT International Search Report, PCT/US2011/058901, filed Nov. 2, 2011, Mail Date: May 29, 2012.

* cited by examiner

*Primary Examiner* — Virginia Manoharan
(74) *Attorney, Agent, or Firm* — Karen R. DiDomenicis

(57) ABSTRACT

A fluid delivery apparatus is provided for supplying a fluid mixture to a distillation column or reactor. The apparatus can be used to enhance the heat duty, the flow and/or the flow stability of an existing thermosiphon reboiler which supplies a heated fluid to the column or reactor. The apparatus includes an integrated eductor which receives and increases the fluid velocity of a supplemental fluid into which the heated fluid is aspirated to form a fluid mixture then delivered to the column or reactor. A process and a system utilizing the apparatus are also disclosed, as well as a method of retrofitting an existing system with the apparatus.

9 Claims, 2 Drawing Sheets

APPARATUS, PROCESS AND SYSTEM FOR DELIVERING FLUID TO A DISTILLATION COLUMN OR REACTOR

FIELD

The present disclosure relates to an apparatus useful to increase the duty of a thermosiphon reboiler. The disclosure further relates to a process for delivering heated fluid to a distillation column or reactor and a system utilizing the apparatus.

BACKGROUND

Production rates of existing distillation columns can be limited by reboiler duty, also referred to as reboiler heat duty, or the rate at which heat is transferred from the reboiler to the column. There are a number of reasons that reboiler duty can be insufficient. For instance, the performance of a thermosiphon reboiler can be limited because of fouling, reboiler size, reboiler instability caused by unstable/oscillatory or insufficient fluid flow, or insufficient driving pressure across the reboiler and reboiler channel head. One option for increasing reboiler heat duty for would be to supply supplemental heated fluid to the column using an auxiliary heat exchanger, in addition to the heated fluid from the reboiler. However, this approach generally requires adding one or more large nozzles to the distillation column to supply the additional heated fluid. Unfortunately, this solution is not always practical for large existing columns due to layout or space limitations, or vessel code requirements which require difficult to implement heat treating of the column shell in the area where the new nozzle would be added. Small nozzles are generally unsuitable as the resulting fluid velocities and kinetic energy are generally too high, resulting in excessive nozzle and shell erosion, as well as localized disturbances to the internally flowing fluid velocity and distribution profiles inside the column shell.

It would be desirable to provide a more practical means for increasing the reboiler duty of a thermosiphon reboiler.

SUMMARY

In one embodiment, the disclosure relates to an apparatus for delivering fluid to a distillation column or reactor comprising:
a channel head containing an inner volume, the channel head adapted to receive a first fluid from a first fluid source and a second fluid from a second fluid source, and to supply a fluid mixture to a distillation column or reactor;
wherein the channel head comprises an eductor capable of receiving the second fluid from the second fluid source and introducing the second fluid to the inner volume at a pressure higher than the pressure of the first fluid such that the first fluid can be aspirated into the inner volume and mixed with the second fluid to form the fluid mixture.

In another embodiment, the disclosure relates to a process for delivering heated fluid to a distillation column or reactor comprising:
feeding a first fluid from a distillation column or reactor to a reboiler;
operating the reboiler to heat the first fluid;
flowing a second fluid from a second fluid source through an eductor thereby imparting high velocity flow in the second fluid;
bringing the first fluid and second fluid into fluid communication such that the high velocity flow in the second fluid causes a suction effect aspirating the first fluid into the second fluid to provide a fluid mixture which results in a desired heat duty delivered to the column or reactor; and
delivering the fluid mixture to the distillation column or reactor.

In yet another embodiment, the disclosure relates to a process for increasing reboiler heat duty comprising:
feeding a first fluid to a reboiler having a channel head comprising an eductor in fluid communication with a second fluid source;
operating the reboiler to heat the first fluid;
flowing a second fluid from the second fluid source through the eductor thereby creating a suction effect causing the first fluid to be aspirated with the second fluid to provide a fluid mixture resulting in a desired heat duty;
whereby the suction effect results in increased flow and/or flow stability of the first fluid.

In yet another embodiment, the disclosure relates to a system comprising:
a distillation column or reactor;
a thermosiphon reboiler for heating a first fluid in fluid communication with the distillation column or reactor; and
a channel head attached to one end of the thermosiphon reboiler and in fluid communication with the distillation column or reactor via a return nozzle, wherein the channel head comprises an integrated eductor for receiving a second fluid from a second fluid source and for causing the velocity of the fluid to increase and the pressure of the second fluid to decrease such that first fluid from the thermosiphon reboiler is aspirated into the second fluid.

DETAILED DESCRIPTION

Figure 1:
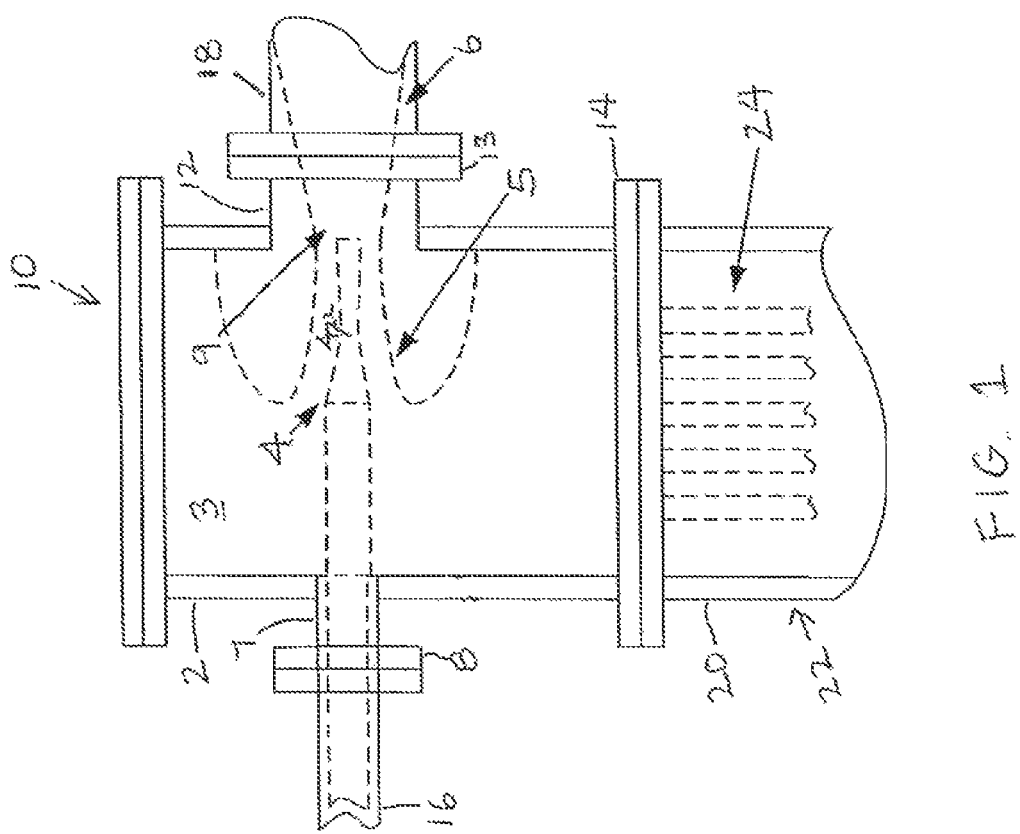
FIG. 1 illustrates an apparatus for delivering fluid to a distillation column or reactor according to one embodiment.

According to one embodiment, a fluid delivery apparatus is provided which enables the duty of a thermosiphon reboiler, such as for example, a vertical thermosiphon reboiler, to be increased.

As is known in the art, the channel head portion of a thermosiphon reboiler, for instance a vertical thermosiphon reboiler, serves to deliver fluid, particularly heated fluid, also referred to herein as a first fluid, from the reboiler to a distillation column or reactor by way of a return nozzle. The reboiler can be a once-through or a recirculating type reboiler. The fluid delivery apparatus of the present disclosure is a channel head for use with a thermosiphon reboiler capable of receiving supplemental fluid, also referred to herein as a second fluid, from a secondary source, also referred to herein as a second fluid source, and increasing the velocity of the supplemental fluid by the use of an integrated eductor within the channel head. As a result, a suction effect is created where the heated fluid from the thermosiphon reboiler enters the channel head and the heated fluid from the reboiler is thus aspirated and mixed with the supplemental fluid. The return nozzle from the reboiler to the column or reactor can be used to deliver the fluid mixture to the column or reactor.

According to the present disclosure, the column or reactor can be any equipment which a reboiler is known to supply, including distillation columns, regenerators, evaporators, batch reactors, continuous stirred tank reactors, and the like. Exemplary distillation unit applications include, but are not limited to, crude stabilizers, naphtha stabilizers, naphtha splitters, de-ethanizers, de-butanizers, de-propanizers, de-pentanizers, amine regenerators, sour water strippers, hydrocracker fractionators, lube oil fractionators and styrene recovery columns.

In one embodiment, the channel head or fluid delivery apparatus of the present disclosure defines an inner volume and is internally designed to act as an eductor in which the driving fluid is the fluid from the second fluid source. As is well known, an eductor includes a converging portion in which the diameter is narrowing, a narrowest neck portion and a widening or diffuser portion. The driving fluid refers to the fluid received by the eductor which increases in velocity and decreases in pressure in the converging portion of the eductor, and decreases in velocity and increases in pressure in the diffuser portion of the eductor. The channel head according to the present disclosure can be thought of as a head-eductor or head-ejector combination, having the eductor built-in or integrated within the inner volume of the channel head. The channel head is thus designed to provide a venturi effect and thereby enhance flow and flow stability of the primary fluid flowing from the reboiler. The internal design of the head is such that the aspiration of the primary fluid from the reboiler into the driving fluid from the second fluid source occurs in the vicinity of the narrow portion of the eductor. Within the diffuser portion, the pressure of the mixed fluid increases. In one embodiment, the fluid mixture can be returned to the column by way of the existing return nozzle on the column.

In one embodiment, the supplemental fluid can be a heated fluid supplied from a supplemental heat exchanger, typically a forced circulation supplemental heat exchanger. The supplemental or second fluid can be a vapor, a liquid or a two phase vapor-liquid mixture. Alternatively, the supplemental or second fluid can be a high-pressure gas, such as fuel gas or steam, or a high-pressure liquid, such as a hydrocarbon stream.

Referring to FIG. 1, fluid delivery apparatus 10 in one embodiment is a channel head, also referred to simply as the head, of a vertical thermosiphon reboiler 22, located at the discharge end of the thermosiphon reboiler. The head includes a head shell 2 enclosing inner volume 3. The head can be any known construction, e.g., a bonnet or channel type head. The head can be stationary or floating. The head shell is adapted to receive a first fluid from a first fluid source, such as by the use of flange 14 to connect with vertical thermosiphon reboiler shell 20. In one embodiment, vertical thermosiphon reboiler 22 includes multiple heat exchange tubes 24. The head shell 2 is adapted to receive a supplemental or second fluid from a second fluid source, such as by the use of nozzle 7 and flange 8 to connect with conduit or pipe 16. The head shell 2 is further adapted to supply a fluid to a distillation column or reactor (not shown in the figure), such as by the use of nozzle 12 and flange 13 to connect with return nozzle 18.

The second fluid from the second fluid source is introduced into the inner volume 3 within the head shell 2 through venturi nozzle 4 integrated into the head shell 2. An inner shroud 5 may be provided to direct the flow of the aspirated fluid and serve as the outer converging and diverging (diffuser) sections of the eductor. The nozzle diameter converges to a narrow or reduced diameter portion 4a such that second fluid flowing through the nozzle increases in velocity and decreases in pressure. As the reduced pressure second fluid is introduced into the inner volume 3 within the head shell 2, the low pressure or suction within the inner volume causes fluid to be aspirated from the reboiler into the second fluid flowing in the inner volume of the head where the first and seconds fluids are consequently mixed within mixing zone 9. Within the diffuser portion 6 of the eductor, the pressure of the fluid mixture is increased. The fluid mixture returns to the distillation column or reactor via return nozzle 18. It would be apparent to one skilled in the art to design the dimensions of the eductor depending on the circumstances of the particular application. Factors that would influence the design include the specific equipment dimensions, pressure ratio between the second and first fluids, flow rate of the second fluid, percent vaporization of the second fluid, conditions including temperature, and physical and thermal properties of both fluids, e.g., fluid densities, fluid viscosities and fluid heat capacities.

In one embodiment, the first and/or second fluid is a single phase liquid; in another embodiment, the first and/or second fluid is two phase fluid including liquid and vapor. The second fluid can be a liquid, a gas or a combination thereof.

Advantageously, the head pressure is reduced during operation. The flow rate, flow stability and duty of the reboiler are improved due to the suction effect produced by the second fluid flowing through the eductor.

In one embodiment, a process for retrofitting an existing reboiler with the fluid delivery apparatus of the present disclosure is provided in order to increase the reboiler duty. The existing conventional channel head of an existing reboiler is detached from the reboiler body and the return nozzle, and the existing channel head is removed and replaced with the fluid delivery apparatus or channel head of the present disclosure.

Figure 2:
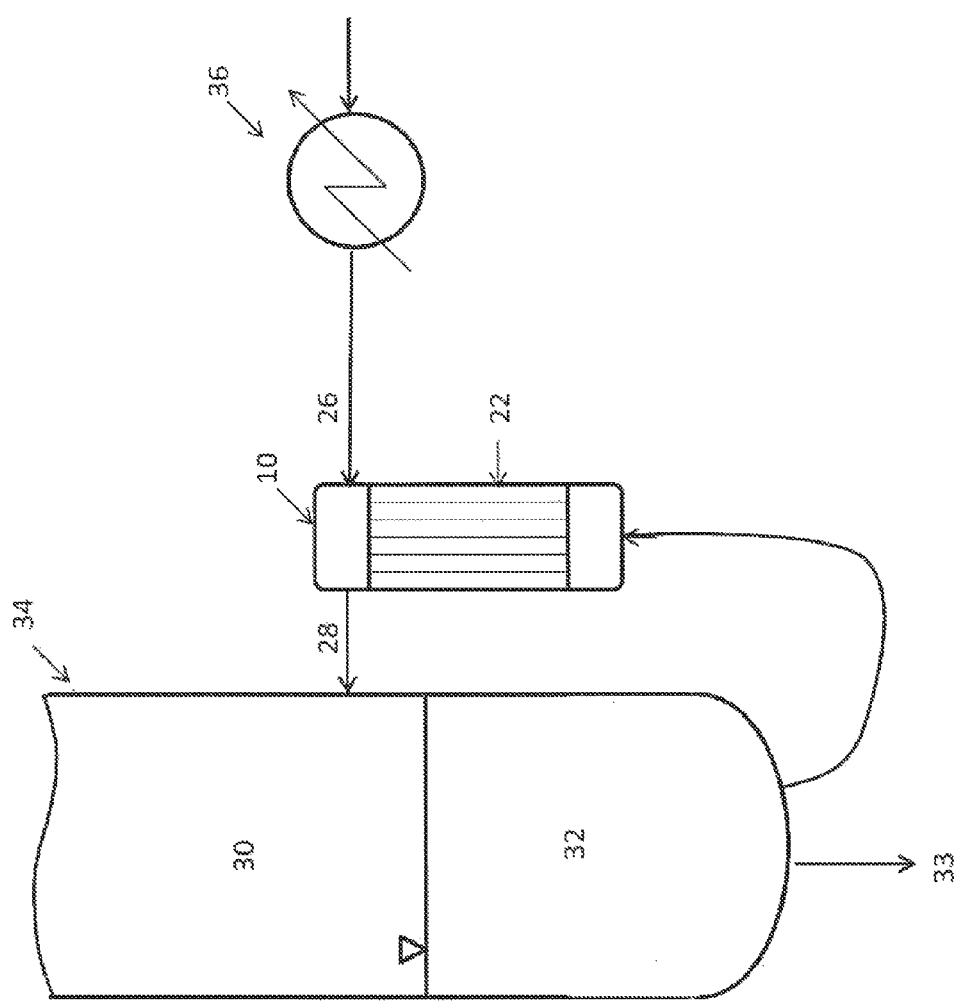
FIG. 2 illustrates a system including a distillation column or reactor, a reboiler for supplying heated fluid to the distillation column or reactor and an apparatus for delivering fluid to a distillation column or reactor according to one embodiment.

One embodiment of a system utilizing the fluid delivery apparatus of the present disclosure is illustrated in FIG. 2. Vertical thermosiphon reboiler 22 heats a liquid stream delivered from distillation column or reactor 34. The fluid delivery apparatus or channel head 10 having built-in eductor as previously described herein is securely mounted on top of the reboiler. A second fluid 26 is supplied to the fluid delivery apparatus 10 from second fluid source 36. The second fluid source shown in the figure is a supplemental heat exchanger. The operation of the fluid delivery apparatus 10 is described above, and results in fluid mixture 28 of a desired temperature being delivered to distillation column or reactor 34 via a return nozzle (not shown). The fluid separates into the vapor 30 and liquid 32 within the column. In one embodiment, liquid product 33 is removed from the column as shown.

Additionally, the fluid delivery apparatus of the present disclosure is well-suited to enable increased capacity of distillation processes occurring on offshore installations since a distillation column-thermosiphon reboiler system or a reactor-thermosiphon reboiler system on offshore platform, for example, can be retrofitted without adding significantly to the weight or space of the system.

It will be appreciated that the fluid delivery apparatus of the present disclosure can be modified for use in a wide variety of other applications not disclosed herein. In each case, the fluid delivery apparatus can be used to improve the flow and/or flow stability of a fluid mixture. For example, in one embodiment, rather than delivering fluid to a distillation column or reactor, the apparatus can be adapted to function as a device for delivering a fuel-oxidizer mixture to an internal combustion engine. In this case, liquid fuel can be aspirated into a high velocity stream of an oxidizer, e.g., air, and the fuel-air mixture can be delivered to an engine. As another example, the fluid delivery apparatus can be adapted to combine fluids for delivery into the human body.

What is claimed is:

1. An apparatus for delivering fluid to a distillation column or reactor consisting essentially of:
   a channel head located at the discharge end of a thermosiphon reboiler, the channel head containing an inner volume and being capable of receiving a first fluid from a thermosiphon reboiler and a second fluid from a second fluid source, and being capable of connecting to a return nozzle in the distillation column or reactor and supplying a fluid mixture of the first fluid and the second fluid to a distillation column or reactor via the return nozzle to the distillation column or reactor;
   wherein the channel head comprises an eductor integrated within the channel head capable of receiving the second fluid from the second fluid source and introducing the second fluid to the inner volume at a pressure higher than the pressure of the first fluid such that the first fluid can be aspirated into the inner volume and mixed with the second fluid to form the fluid mixture.

2. The apparatus of claim 1 wherein the second fluid source is a supplemental heat exchanger.

3. A process for delivering heated fluid to a distillation column or reactor consisting essentially of:
   feeding a first fluid from a distillation column or reactor to a thermosiphon reboiler having a channel head located at the discharge end of the thermosiphon reboiler;
   operating the thermosiphon reboiler to heat the first fluid;
   flowing a second fluid from a second fluid source through an eductor integrated within the channel head thereby imparting high velocity flow in the second fluid;
   bringing the first fluid and second fluid into fluid communication such that the high velocity flow in the second fluid causes a suction effect aspirating the first fluid into the second fluid to provide a fluid mixture of the first fluid and the second fluid in the channel head which results in a desired heat duty delivered to the column or reactor; and
   delivering the fluid mixture to the distillation column or reactor via a return nozzle to the distillation column or reactor.

4. The process of claim 3 wherein the second fluid is selected from a liquid, a gas, or a combination thereof.

5. A process for increasing reboiler heat duty consisting essentially of:
   feeding a first fluid to a thermosiphon reboiler having a channel head located at the discharge end of the thermosiphon reboiler comprising an eductor integrated within the channel head in fluid communication with a second fluid source;
   operating the thermosiphon reboiler to heat the first fluid;
   flowing a second fluid from the second fluid source through the eductor thereby creating a suction effect causing the first fluid to be aspirated with the second fluid to provide a fluid mixture of the first fluid and the second fluid resulting in a desired heat duty;
   wherein the results of the suction effect are selected from the group consisting of reduced head pressure of the thermosiphon reboiler, increased flow and flow stability of the first fluid.

6. A system comprising:
   a distillation column or reactor having a return nozzle therein;
   a thermosiphon reboiler for heating a first fluid in fluid communication with the distillation column or reactor; and
   a channel head attached to one end of the thermosiphon reboiler located at the discharge end of the thermosiphon reboiler and in fluid communication with the distillation column or reactor via the return nozzle to the distillation column or reactor, wherein the channel head consists essentially of an integrated eductor for receiving a second fluid from a second fluid source and for causing the velocity of the fluid to increase and the pressure of the second fluid to decrease such that first fluid from the thermosiphon reboiler is aspirated into the second fluid.

7. The system of claim 6 further comprising a second fluid source in fluid communication with the eductor.

8. The system of claim 6 wherein the fluid is selected from a liquid, a gas, or a combination thereof.

9. The system of claim 6 wherein the system is located on an offshore platform.

* * * * *